July 14, 1959 C. A. SCHREIBER 2,894,637
FEEDWELLS FOR SEDIMENTATION TANKS
Filed Jan. 11, 1956 6 Sheets-Sheet 1

INVENTOR.
Charles A. Schreiber

INVENTOR.
Charles A. Schreiber

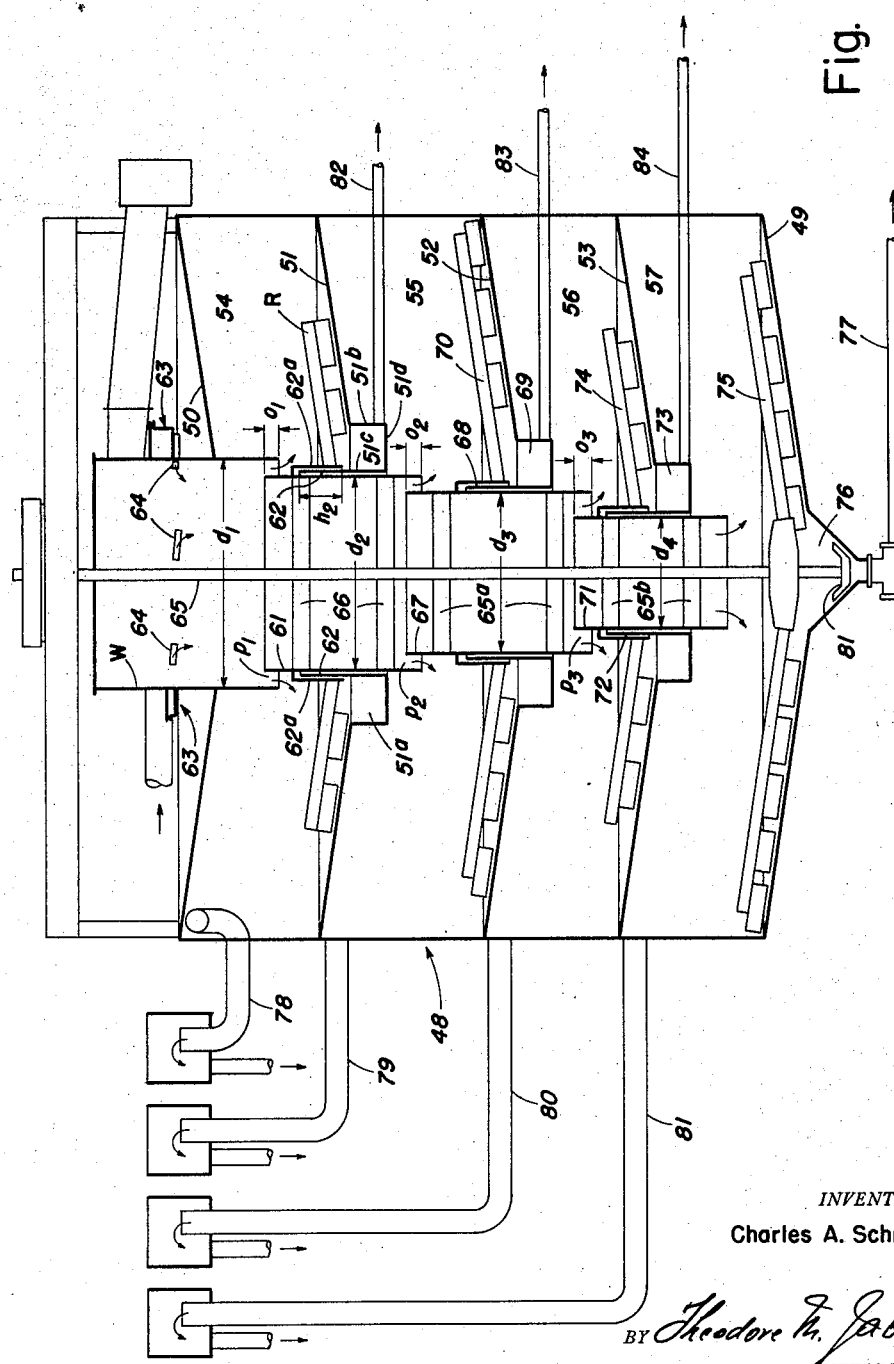

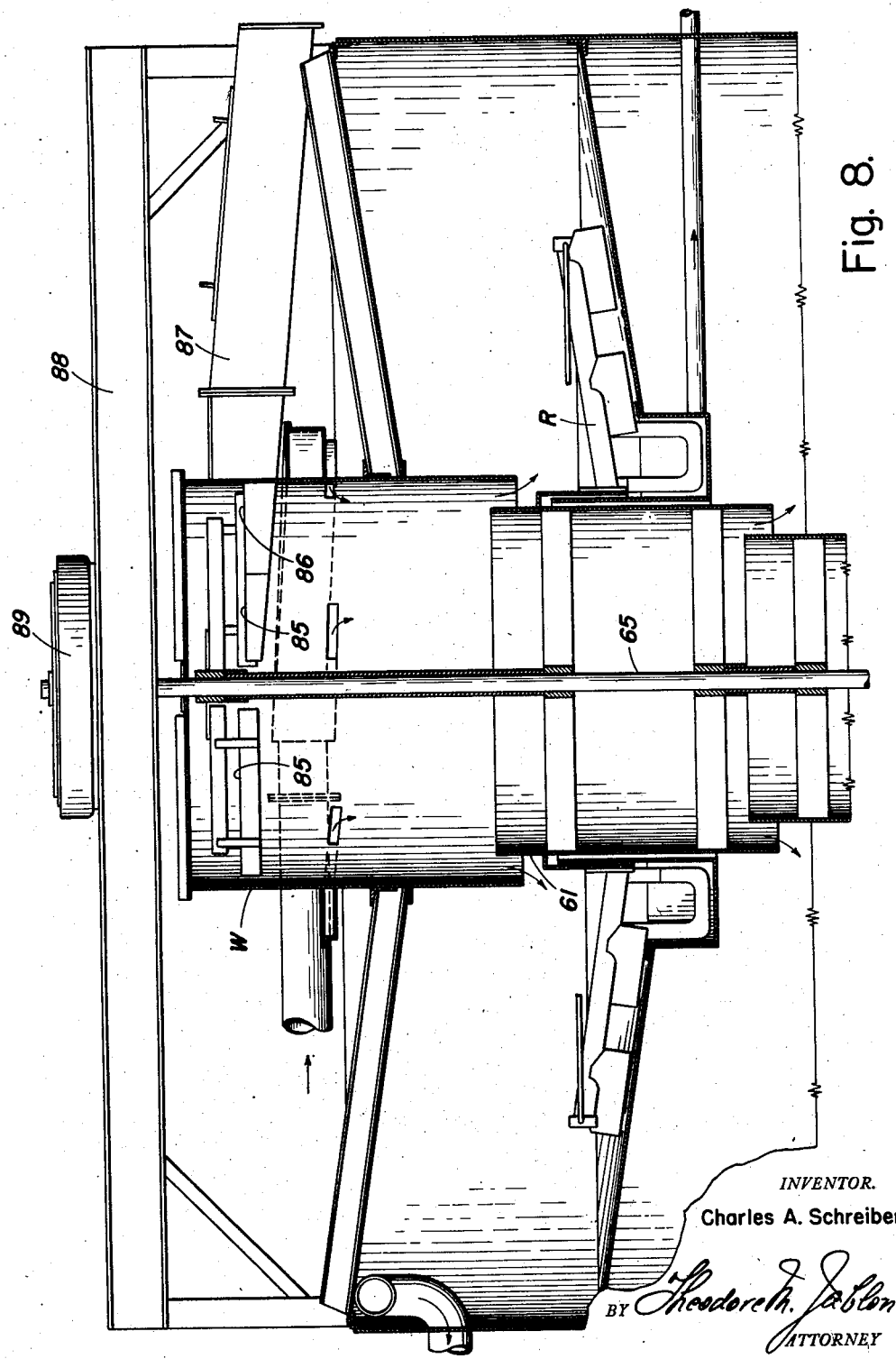

July 14, 1959   C. A. SCHREIBER   2,894,637
FEEDWELLS FOR SEDIMENTATION TANKS
Filed Jan. 11, 1956   6 Sheets-Sheet 6

INVENTOR.
Charles A. Schreiber

BY *Theodore M. Jablon*
ATTORNEY

United States Patent Office 2,894,637
Patented July 14, 1959

2,894,637

FEEDWELLS FOR SEDIMENTATION TANKS

Charles A. Schreiber, Springdale, Conn., assignor to Dorr-Oliver Incorporated, Stamford, Conn., a corporation of Delaware Application January 11, 1956, Serial No. 558,576

8 Claims. (Cl. 210—519)

This invention relates to settling tanks of the single or multi compartment type in which sludge is removed from the bottom and clarified liquid from the top of the compartment(s).

A problem encountered in such apparatus, especially when used in clarification of liquids that are polluted by light or flocculent suspended solids, is to distribute the incoming feed in a way to cause a minimum disturbance of the gravitational sedimentation effects that continually proceed therein. The liquid at the top of the tank is substantially finished of its clarification treatment and is ready to be discharged by overflow as one end product of the tank. Therefore, it is important that this finished supernatant liquid not be re-polluted with incoming feed carrying suspended solids with it. So one aim is to direct or deflect the incoming feed away from the finished supernatant layer in the tank. On the other hand, solids that were suspended and have been subjected in the tank to sedimentation processes have settled to the bottom of the tank as sediment. As sediment, the traveling rakes impel it to discharge under such conditions of slight molestation that the sediment is not re-diffused into the liquid being treated in the tank. It becomes important that the feed to the tank incoming through the feedwell shall not be directed downwardly to an extent that would disturb or rediffuse the sediment into dispersion. So one object of this invention is to devise an arrangement by which feed incoming to a mechanically-cleaned settler through a feedwell can be directed and distributed selectively to the middle horizontal zone of a settler in a manner to avoid polluting the supernatant liquid in the settler or tend to avoid disturbing the settled sediment on the bottom of the settler. It has been found that the forces operating in a settler to sediment or settle solids in suspension are delicately balanced forces whose equilibrium is easily upset. If eddies are present or a current flow is set up, such as by convection, the settling efficiency of the settler is decreased. Accordingly, another object of this invention is to supply the incoming feed from the feedwell to the tank contents in a manner by which its introduction and distribution is effected as to velocities and direction under such conditions that the gravitational sedimentation forces are interfered with to a minimum extent.

This object is attainable according to this invention by simultaneously and convergingly introducing into the feedwell a plurality of streams of feed liquid of substantially equal volume and intensity, with the result that the influent energy of the feed liquid is dispersed substantially evenly across the area of the feedwell and in a manner whereby the liquid leaving the feedwell spreads out into the surrounding quiescent body substantially evenly in all directions, namely in a widening zone of transition outside the feedwell.

As this invention may be embodied in several forms without departing from the spirit or essential characteristics thereof, the present embodiment is therefore illustrative and not restrictive since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

Figure 6 is a development of the feed distributing conduit that surrounds the feedwell structure.

Figure 7 shows the invention embodied in a multiple compartment thickener or clarifier.

Figure 8 shows the top portion of the Figure 9 thickener enlarged, including the feedwell and the top sedimentation compartment.

Figure 1:
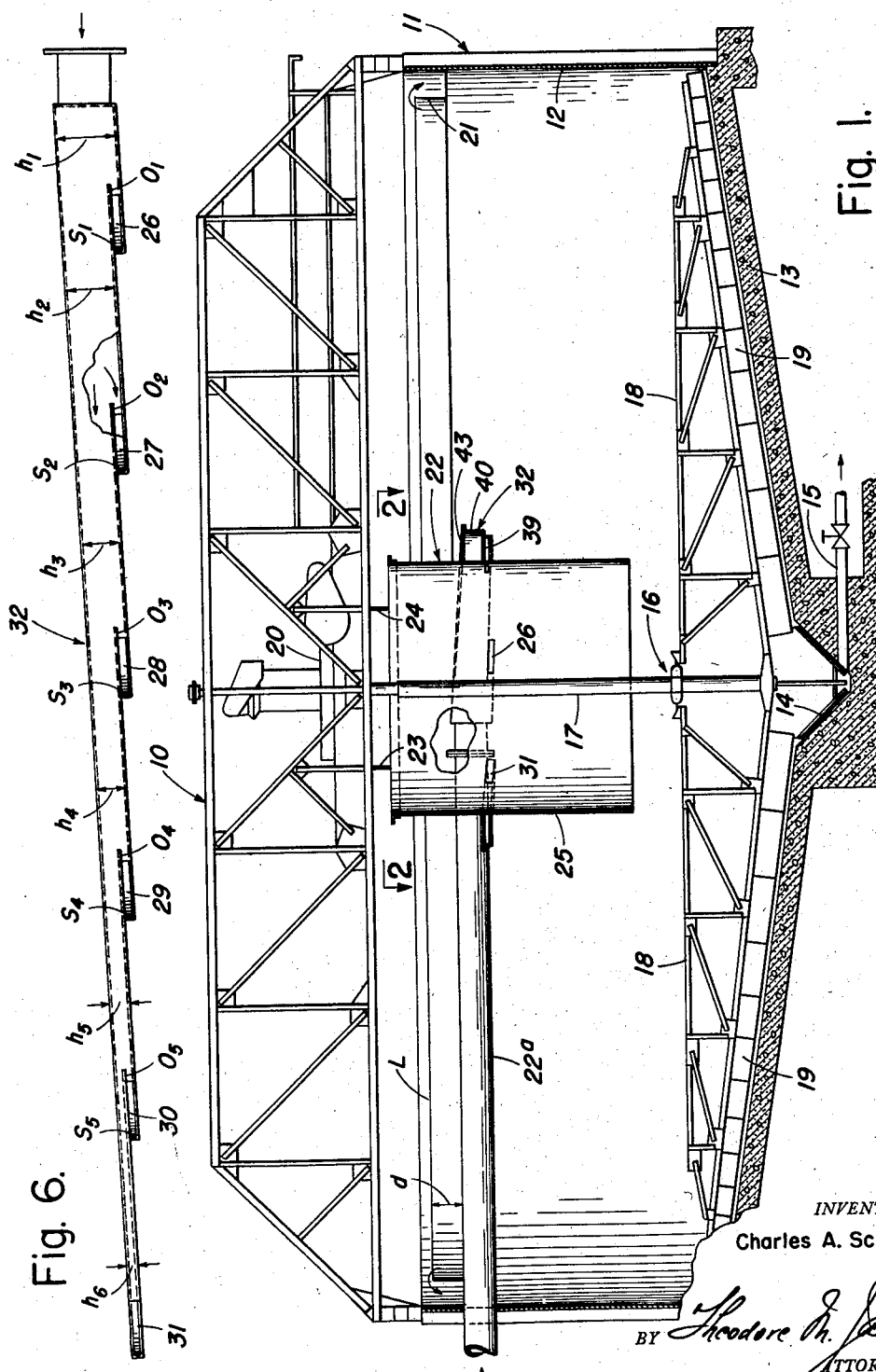
Figure 1 is a vertical sectional view of the sedimentation tank of the improved feedwell structure along with its feed supply pipes in conjunction with an overhead truss construction for supporting the feedwell as well as a rotary rake structure in the tank.

The feedwell structure of this invention is shown by way of example as embodied in the type of settling tank that has an overhead structure 10 spanning the tank 11 which has a wall 12 and a shallow conical bottom 13 at the center of which is a sump 14 with sludge withdrawal pipe 15.

Rotatably supported from the overhead construction 10 is a rotary rake structure 16 of conventional type having a vertical shaft 17 and rake arms 18 provided with the usual rake blades 19 for conveying sludge over the tank bottom 13 to the sump 14 for withdrawal therefrom. Also supported upon the overhead truss construction 10 is drive mechanism indicated at 20 for rotating the rake structure 16. The tank has at the top thereof the usual peripheral effluent launder 21 for receiving and discharging the overflow of clarified liquid from the tank.

Also supported from the overhead truss construction 10 is a feedwell structure 22, its support being indicated by a pair of rigid suspension members 23 and 24. This feedwell structure 22 has a horizontal submerged feed supply pipe 22ᵃ and comprises a cylindrical feedwell member 25 proper having submergedly disposed horizontally elongated feed openings shown to be of rectangular shallow configuration definable by their width "$w$" and their height "$h$." By way of example there are shown in this embodiment (see Figure 2) six such feed openings, namely a first opening 26, a last opening 31 and intermediate openings 27, 28, 29, 30 spaced from one another along the circumference of the feedwell 25.

A feed distributing conduit 32 supplies all these feed openings 26 through 31, in that it surrounds the feedwell member 25 starting at the first feed opening 26 and terminating at the last opening 31.

This conduit 32 is of substantially rectangular cross-section although of a cross-section that diminished in the direction of flow through that conduit. That is to say, the cross-section of the conduit diminishes as it emits partial or split-off or scalped-off streams of liquid through the respective feed openings into the interior of the feedwell member 25. By converging upon one another, these partial streams issuing from the respective feed openings have their energies dispersed with respect to one another. More specifically, in accordance with Figures 2, 3, 4 and 5 the inwardly directed split-off streams of feed liquid have their flows directed convergingly with respect to one another, for example, as by horizontal radially directed mouth portions 33 which extend inwardly from the respective feed openings. Whereas these mouth pieces are here shown to be straight with opposed walls thereof extending parallel to one another providing these mouth pieces may nevertheless be shaped to have gradually increasing cross-section in which instance the extreme outer end of the mouth piece would be larger than the feed opening proper. Widening or flaring the inner ends of the mouth pieces in this manner may further encourage dispersal of the energy of the partial streams of said liquid converging upon one another within the area of the feedwell 25.

Figure 4:
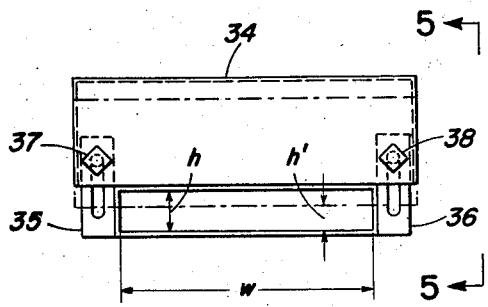
Figure 4 is a further enlarged detail view taken on line 4—4 of Figure 2 of the adjustable blank-off means for the influent mouth pieces of inside the feedwell.
Figure 5:
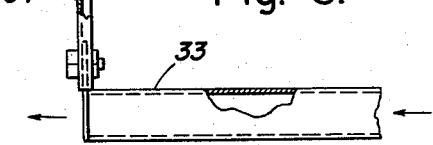
Figure 5 is a side view taken on line 5—5 of the detail of Figure 4.

Furthermore, each mouth portion 33 is here shown to be provided with adjustable blank-off means in the form of a vertical plate member 34 adjustably held by a pair of vertically slotted tabs 35 and 36 flanking the free end of the mouth portion and unitary therewith, together with a corresponding pair of bolt connections 37 and 38. The detail Figures 4 and 5 show the full line uppermost position of the blank-off plate 34 allowing for full or unrestricted flow of liquid from the mouth portion, whereas a somewhat lower position of the blank-off plate 34, as indicated in that dot-and-dash, presents a restricted or reduced through-flow area of a restricted height $h'$ as compared with the full or unrestricted height $h$ of the feed opening.

Figure 2:
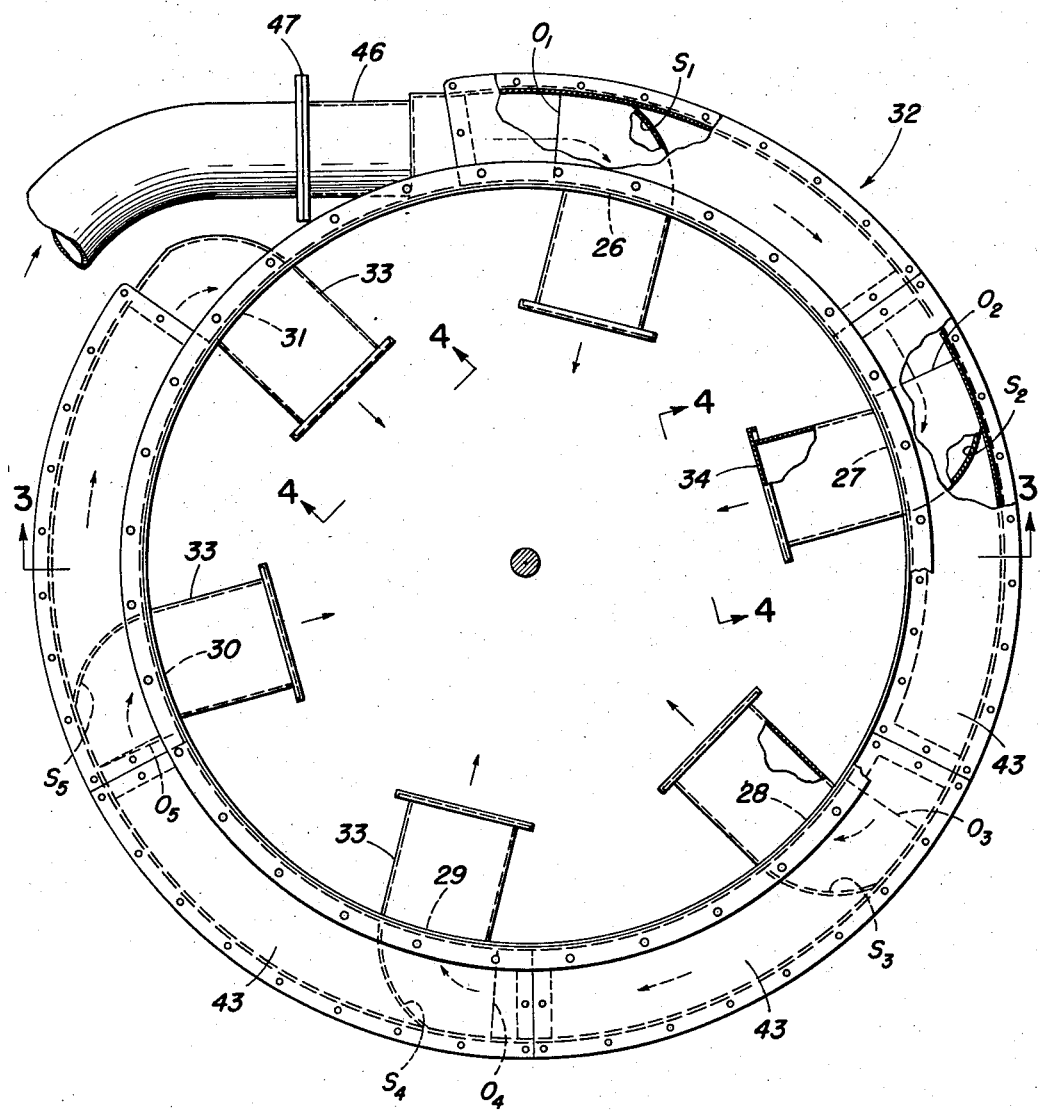
Figure 2 is a greatly enlarged detail cross-sectional view taken on line 2—2 of Figure 1, presenting a top view of the feedwell structure, although with the addition of stream-emitting mouth pieces which at feed inlet openings together with adjustable blank-off means therefor.
Figure 3:
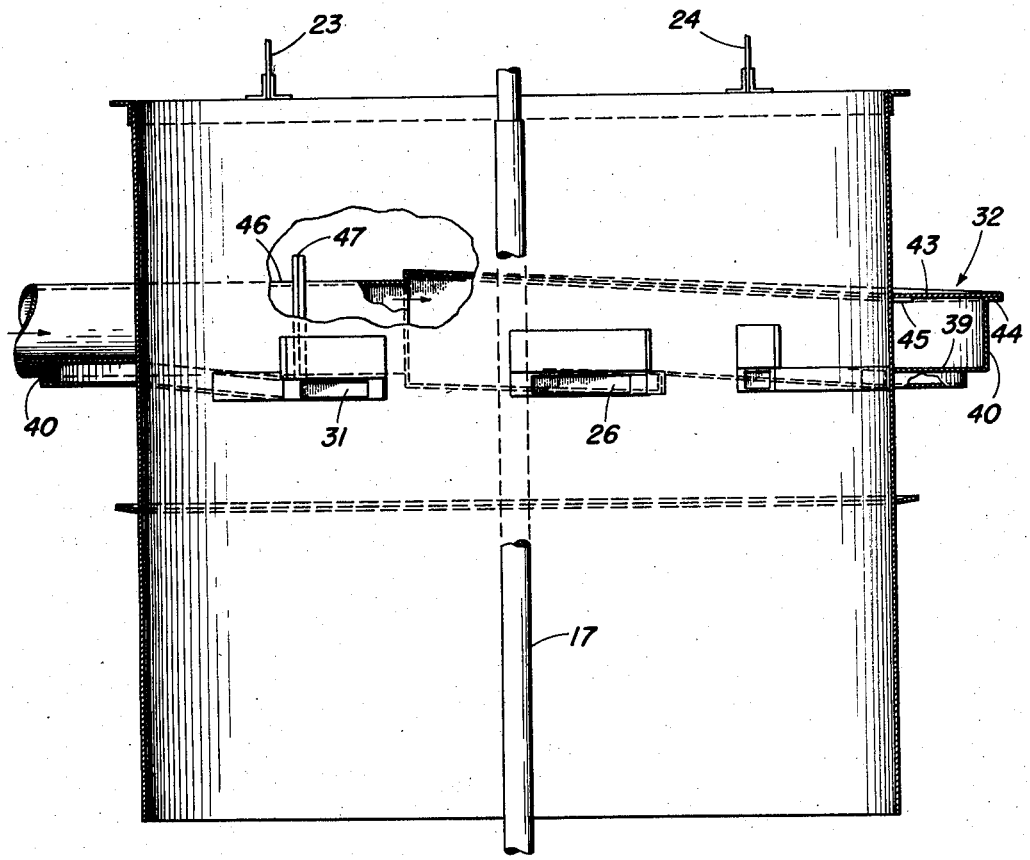
Figure 3 is a vertical sectional view taken on line 3—3 of Figure 2 with a further portion of the feedwell broken away to expose the influent pipe connection therefor.

The distributing feed conduit 32 (see also the development thereof in Figure 6) comprises a bottom portion 39 welded to the feedwell member 25 and formed with stream-diverting steps $s_1$ and $s_5$ at each of the respective feed openings 26 through 31 respectively, each of the steps in turn having a curved configuration such as is visible clearly in the plan view of Figure 2, for effecting and facilitating the splitting-off or scalping-off of the partial streams for emission through the respective feed openings into the feedwell 25. These bottom steps $s_1$ through $s_5$ diminishes the effective flow cross-section of the conduit 32 as the stream therein passes from one feed opening to the next, inasmuch as the height of the conduit is thus reduced from a maximum height $h_1$ at the first feed opening 26 to a minimum height $h_6$ at the last feed opening 31. This step formation as viewed from the side (see also Figure 6) gives the conduit 32 a sawtooth-like appearance. The bottom portion 39 also provides an overhang $o_1$ through $o_5$ for the respective feed steps $s_1$, $s_2$, $s_3$, $s_4$, $s_5$ to encourage the scalping-off of the partial streams for emission through the respective feed operating into the feedwell 28.

The distributing conduit 32 further comprises an outer vertical wall 40 the lower edge of which is jagged in the sense that it corresponds to the sawtooth shaped contour of the bottom formation corresponding to the steps $s_1$ through $s_5$ aforementioned. The conduit 32 is closed at the top by removable top cover plates or sectors 43 held in place by an outer flange 44 formed at the top end of the vertical wall 40, and an inner flange or ledge 45 welded to the outer face of feedwell 45 and at the identical level as the outer flange 44.

The distributing conduit 32 is shown to have an inlet neck portion 46 having a flange connection 47 with the horizontal feed supply pipe $22^a$ extending in submergence with the tank and here shown to be submerged a distance "$d$" below the overflow level "L" of the liquid body in the tank.

The multiple compartment thickener or clarifier as exemplified in the Figures 7 and 8 embodiment of the invention comprises the tank 48 proper having a bottom 49 and a top 50, as well as intermediate bottoms or so-called trays 51, 52, 53 respectively. In this way, the tank is sub-divided into a number of superposed sedimentation compartments, namely a top compartment 54, a pair of intermediate compartments 55 and 56, and a bottom compartment 57. These compartments operate in parallel although within a hydraulically balanced system in that each compartment receives its share of feed supply liquid and has its own overflow discharge of clarified liquid as well as its own sludge withdrawal means.

These sedimentation or clarification compartments are defined by the aforementioned intermediate bottoms or trays 51, 52, 53 each of these trays having a central opening associated with an annular sludge collecting sump surrounding the opening. Each sedimentation compartment furthermore is served by a set of rotary bladed rake arms for moving the sediment or sludge over the compartment bottom into the respective annular sump for withdrawal therefrom. Each such set of rake arms is rigidly connected with and supported by an intermediate rotary feed cylinder or feedwell, all of which intermediate feedwells in turn are rigidly connected as by spider structure to a central vertical shaft driven in the usual manner. In this way the central shaft constitutes a rigid structure with the respective sets of rake arms by way of the intermediate feedwell cylinders carrying the rake arms. Furthermore, each intermediate rotary feedwell cylinder has sludge-sealing relationship with the surrounding inner upstanding cylinder wall of the surrounding annular sludge sump, and each such intermediate feedwell cylinder extends from one compartment down through the tray opening into the next lower compartment, whereby the lower end portion of each such feedwell cylinder surrounds the upper end portion of the next lower feedwell cylinder thereby providing between respective feed cylinders an annular passage through which each respective compartment may receive its share of the feed liquid supplied to the top of the tank.

That is to say, the intermediate bottom 51 has an annular sludge collecting sump or trough $51^a$ defined by an outer cylindrical wall $51^b$, an inner cylindrical wall $51^c$ rising above the bottom 51, and by an annular flat bottom $51^d$. The inner wall $51^c$ of this annular sump surrounds the first intermediate cylinder 61 providing therewith a labyrinth sludge seal 62 comprising a bell-shaped portion $62^a$ surrounding the cylindrical wall $51^c$ to constitute an overlap $h_2$.

The upper end portion of the intermediate feedwell cylinder 61 is surrounded by the lower end portion of a stationary main feedwell cylinder $w$ rigid with the top plate 50 of the tank, and provided with the influent feed introducing means described in detail in the Figures 1–6 embodiment and here designated summarily by the numeral 63 providing horizontally elongated feed influent openings 64 in the stationary main feedwell cylinder $w$. Thus, the initial or main feedwell $w$ forms with the next following intermediate feedwell cylinder 61 an overlap $o_1$ and thereby an annular feed passage $p_1$ leading into the compartment 54. The intermediate feedwell cylinder 61 is concentric with and rigidly connected to the vertical shaft 65, by means of sets of spider arms 66, while a set of rake arms R extend rigidly from the bell shaped portion $62^a$ thus being rigidly connected through the feedwell cylinder 61 with the vertical shaft 65.

Similarly, the next lower intermediate feedwell cylinder 67 having a diameter $d_3$ is rigidly carried by the vertical shaft 65 through spider arms $65^a$ and forms with the preceding feedwell cylinder 61 an overlap "$o_2$" constituting an annular feed passage "$P_2$" leading into compartment 55. The feedwell cylinder 67 has a sludge seal 68 with tray 52, similar to the one described above for compartment 54. The tray 52 has an annular sludge collecting sump 69 into which sludge from the tray is delivered by a set of rake arms 70 rigidly carried by the feedwell cylinder 67. Again, the next lower or last feedwell cylinder 71 having a diameter $d_4$ is rigidly carried by the shaft 65 through spider arms $65_b$ and forms with the preceding feedwell cylinder 67 an overlap "$o_3$" constituting an annular feed passage "$p_3$" leading into compartment 56. The feedwell cylinder 71 forms with tray 53 a sludge seal 72 similar to sludge seals 62 and 68 of the preceding compartments. The tray 53 has an annular sludge collecting sump 73 into which sludge is delivered by a set of rake arms 74 rigidly carried by the feedwell cylinder 71. Thus, the balance or last share of the feed liquid passes from feedwell cylinder 71 into the bottom compartment 57 where a set of rake arms 75 rigidly carried by the vertical shaft 65 delivers sludge over the tank bottom 49 into a conical sump 76 for withdrawal through discharge pipe 77.

Thus, it will be understood that in the operation of this multiple tray clarifier feed liquid is proportioned in substantially equal shares to the respective compartments by way of the respective annular feed passages $p_1$, $p_2$, $p_3$. Through the novel feed introducing means 63 feed liquid in the initial main feedwell $w$ is uniformly dispersed across the area thereof with the influent energy of the liquid similarly dissipated, so that uniform shares of the feed liquid may be scalped off the vertical supply stream through the annular feed passages $p_1$, $p_2$, $p_3$. Clarified liquid passes from the individual compartments by way of respective overflow pipes 78, 79, 80, 81 while sludge from the compartments is withdrawn or pumped in a controlled manner by way of sludge discharge pipes 82, 83, 84 and 77, the pumping means here not being shown.

Since multiple compartment tanks of this kind are often used in the clarification treatment of sugar juice, the top portion of the tank shown in Figure 8 comprises rotary scum skimming means 85 within the initial or main stationary feedwell cylinder $w$. These skimmers rotating with the shaft 65 sweep the scum into a stationary radial receiving trough 86 having a scum discharge pipe 87. The vertical shaft 65 is supported from a superstructure 88 upon which is mounted the drive mechanism indicated at 89, the lower end of the shaft having a conical scraper 81 in the conical sump 76 (see Figure 7).

Figure 9:
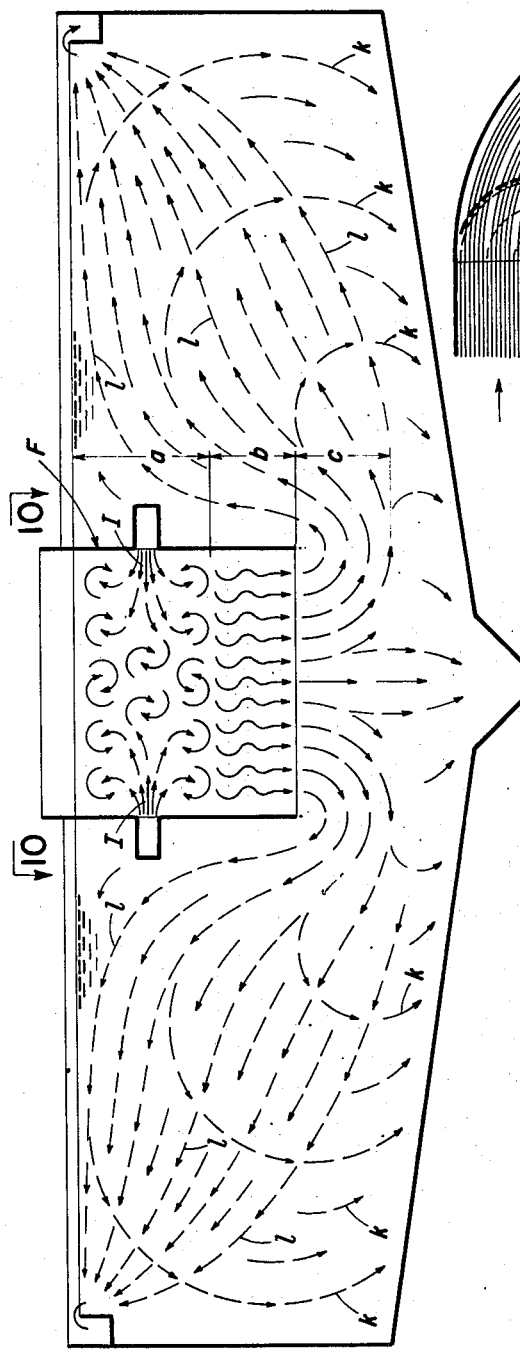
Figure 9 is a diagrammatic vertical sectional view of the feedwell, illustrating the energy dispersing flow conditions therein.
Figure 10:
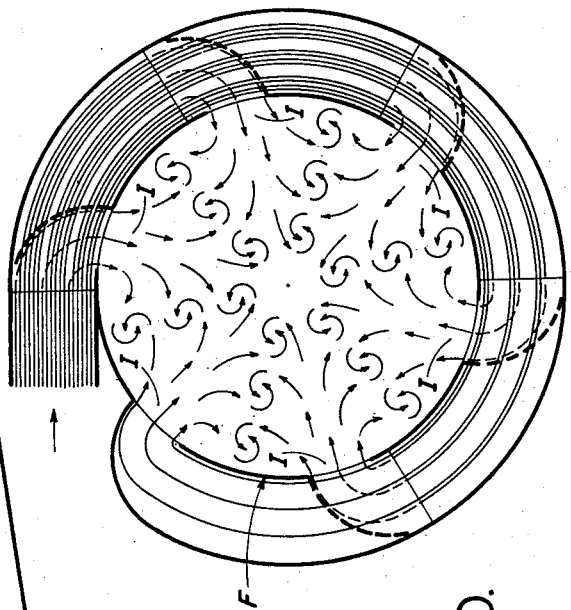
Figure 10 is a diagrammatic cross-sectional view taken on line 10—10 of Figure 9, also illustrating the energy dispersing influences therein.

A diagrammatic presentation of the effect of influent dispersion and energy dissipation is rendered in the Figures 9 and 10. This presentation indicates within the feedwell "F" a zone "$a$" of uniform mixing or homogenization across the feedwell area resulting from the convergence of the influent stream "I." Subjacent to zone "$a$" there is indicated within the feedwell a zone "$b$" of mollification and flow-rectification, which is followed by a zone of the depth "$c$" through which the previously homogenized influent stream mushrooms out or spreads substantially horizontally and by way of transition into the quiescent body of water surrounding the feedwell in the tank. The flow lines in the quiescent body indicate the improved utilization of the available tank volume to effect settling (indicated by flow line "$k$") as well as clarification (indicated by flow line "$l$"). This improved tank utilization and efficiency is thus attributable to the improved manner of introducing the feed liquid and of dissipating the influent energy of the feed liquid in such a manner that there is established a uniform distribution of flow not only radially in all directions from the lower end of the feedwell, but also through a depth such as indicated by the depth of the transitional zone "$c$."

I claim:

1. In a sedimentation tank adapted to hold a body of liquid and provided with centrally disposed means for introducing solids carrying feed liquid into said body for clarification, and having sludge collecting and sludge discharge means at the tank bottom as well as overflow means for clarified liquid at the top; a feedwell structure for introducing said feed liquid which comprises a cylindrical feed member having along its circumference and spaced from one another a plurality of normally submerged influent openings including a first and a last opening adjacent to one another, and a feed distributing conduit surrounding said feedwell from said first to said last opening and branchwise connected with said feedwell member to supply to said feed openings split streams for feed liquid, whereby said influent split streams are directed inwardly from all directions into a horizontal zone of mutual interference within said feedwell member so that the liquid from said zone of interference is adapted to pass downwardly through the cylindrical feedwell member as a substantially equalized velocity throughout the cross-sectional area thereof.

2. The feedwell structure according to claim 1, in which said surrounding conduit comprises a substantially flat top portion joined with said feedwell member, a substantially flat bottom portion also joined with said feedwell member and formed with step-up portions disposed at each respective feed opening and shaped for diverting respective split streams of feed liquid into and through the respective opening, a substantially vertical outer wall portion inter-connecting said top and bottom portions of said surrounding conduit, and a feed influent connection at the wide end of the said surrounding conduit.

3. The feedwell structure according to claim 1, in which said surrounding conduit comprises a substantially flat bottom portion joined with said feedwell member and formed with step-up portions disposed at each opening and shaped for diverting a respective split stream of feed liquid into and through the respective opening, a wall portion rising from said bottom portion along the outer edge thereof, a flange provided to extend along the top edge of said wall portion and continuing along a corresponding circumferential portion of said feedwell member and a substantially flat top cover member removably fastened to said flange.

4. The feedwell structure according to claim 1, in which each of said feed influent openings has a mouth portion extending radially inwardly from said opening.

5. The feedwell structure according to claim 1 in which each feed opening has a mouth portion directed radially inwardly up from said opening, with the addition of adjustable blank-off means for each mouth portion.

6. The feedwell structure according to claim 1, in which each said feed opening has adjustable blank-off means disposed at the influent emitting side of said feed openings.

7. The feedwell structure according to claim 1, in which said surrounding conduit comprises a substantially flat top portion joined with said feedwell member, a substantially flat bottom portion also joined with said feedwell member and formed with step-up portions disposed at each respective feed opening and shaped for diverting respective split streams of the liquid into and through the respective opening, a substantially vertical outer wall portion inter-connecting said top and bottom portions of the conduit, each step-up portion having a substantially horizontal overhang for the associated feed opening extending substantially co-planar with the respective stepped up bottom portion while overhanging the respective lower bottom portion so as to form a shallow branch conduit effective to scalp off a respective partial stream of feed liquid for emission through the respective feed opening.

8. In a multi-tray clarifier adapted to hold a plurality of superposed liquid bodies and provided with centrally disposed means for introducing solids carrying feed liquid into said bodies for clarification, and having sludge collecting and sludge discharge means at the bottom of each body of liquid as well as overflow means for clarified liquid at the top of each body of liquid; a feedwell structure for introducing said feed liquid which comprises a cylindrical feed member having along its circumference and spaced from one another a plurality of normal submerged influent openings including a first and a last opening adjacent to one another, a feed distributing conduit surrounding said feedwell from said first to said last opening and branch-wise connected with said feedwell member to supply to said feed openings split streams of feed liquid, whereby said influent split streams are directed inwardly from all directions into a horizontal zone of mutual interference within said feedwell member so that the liquid from said zone of interference is adapted to pass downwardly through the cylindrical feedwell member and at a substantially equalized velocity throughout the cross-sectional area thereof.

References Cited in the file of this patent

UNITED STATES PATENTS

| | | |
|---|---|---|
| 1,065,494 | Anderson | June 24, 1913 |
| 1,786,969 | Heuel | Dec. 30, 1930 |
| 1,908,102 | Arledter | May 9, 1933 |
| 2,267,516 | Adams | Dec. 23, 1941 |
| 2,364,405 | Trimbey et al. | Dec. 5, 1944 |
| 2,469,825 | Hornstein | May 10, 1949 |
| 2,532,737 | Simpson | Dec. 5, 1950 |
| 2,678,730 | Coulter | May 18, 1954 |